May 26, 1953  J. F. KORSBERG ET AL  2,639,788
STRUCTURAL JOINT
Filed June 27, 1951

INVENTORS
FRANK T. GUSTAFSON
BY JOHN F. KORSBERG
GEORGE SNYDER

AGENT

Patented May 26, 1953

2,639,788

UNITED STATES PATENT OFFICE 2,639,788

STRUCTURAL JOINT

John F. Korsberg, Frank T. Gustafson, and George Snyder, Seattle, Wash., assignors to Boeing Airplane Company, a corporation of Delaware Substituted for abandoned application Serial No. 758,390, July 1, 1947. This application June 27, 1951, Serial No. 233,836

1 Claim. (Cl. 189—36)

This application is a substitute for abandoned application S. N. 758,390, filed July 1, 1947.

This invention relates to structural joints, particularly riveted joints between structural elements subjected primarily to compressive loads.

A typical joint of this nature occurs on airplane wings. The wing of a conventional monoplane is essentially a beam, loaded under normal circumstances to cause compressive forces in the upper skin and other structural members, and tensile forces in the lower parts. Thus the chordwise splices between skin plates of the upper surface are subjected primarily to compressive loads, and secondarily, under certain flight conditions, to tensile loads, which, however, are ordinarily of the order of only 50% of the design compressive loads.

Conventionally, it is a practice to form joints in the wing skin by riveting two adjacent plates to an underlying splice plate or strap. In such a joint the load carried by one piece of skin is transmitted through a first set of rivets to the splice plate, through the splice plate to the second set of rivets, and thence into the second piece of skin. Such a joint, if designed to safely carry the compressive loads, may be greatly overstrength as regards the lesser tensile loads, and thus inefficient from a weight and cost standpoint.

The chief object of this invention is to produce a joint of this general character having fewer and lighter parts, but which will still safely withstand the applied loads.

In essence, this object is accomplished by the insertion of rivets or similar parts directly between the adjacent edges of two members to be joined, so that compressive forces are transmitted directly through such rivets from one member to the other, without being transmitted to a splicing member.

Figure 1:
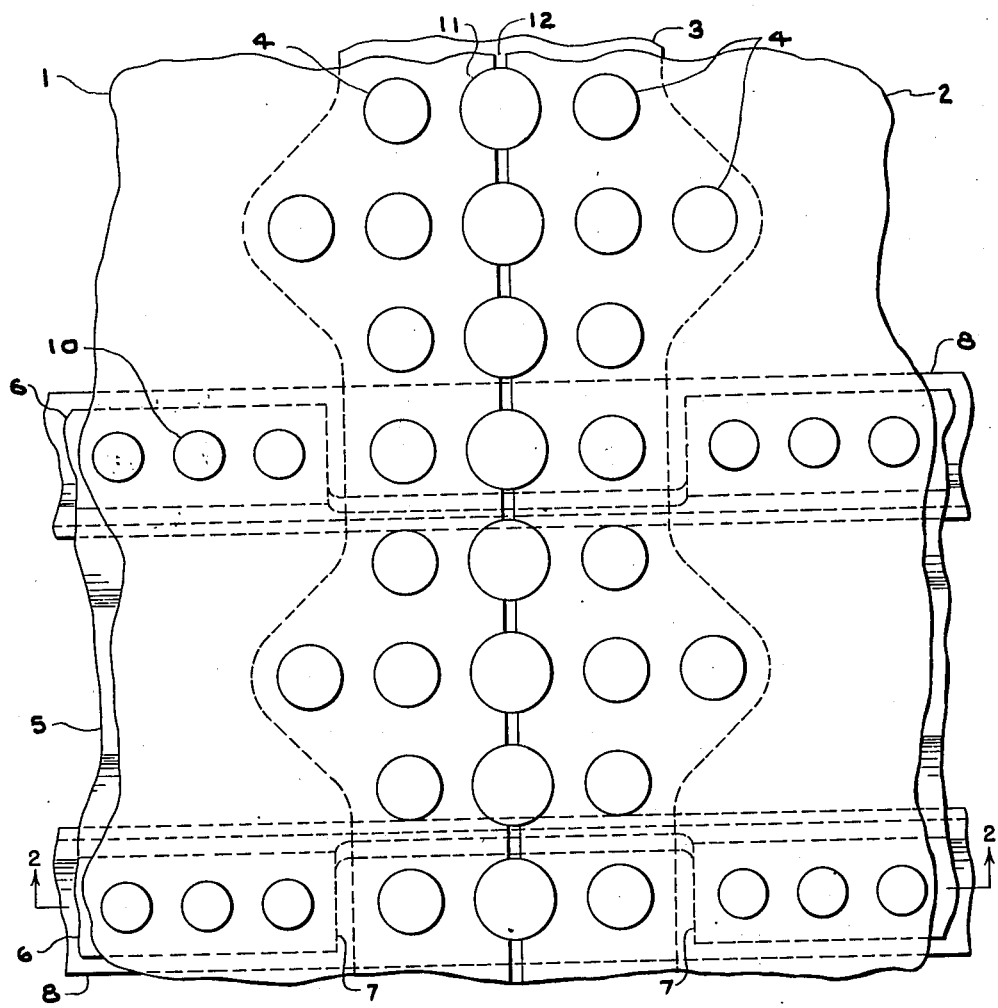
Figure 2:
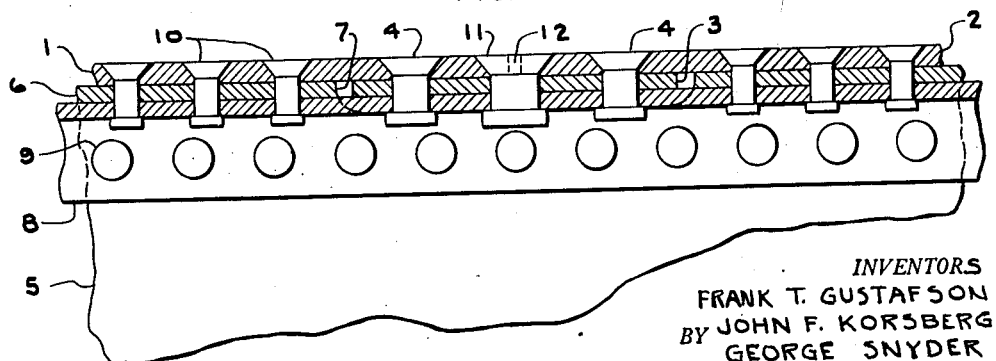

A more detailed understanding of the invention may be had by reference to the accompanying drawings, in which, Fig. 1 is a fragmentary plan view of a joint embodying the invention; and Fig. 2 is a sectional view taken on line 2—2 of Fig. 1.

Referring to these drawings, there are shown two adjacent skin plates 1 and 2, joined by an underlying splice strap 3, to which each plate is attached by means of a number of rivets 4, as is usual practice. Also shown is a spanwise stiffener 5 such as is commonly used. The particular stiffener shown is of generally V-shaped cross-section, having outturned flanges 6 riveted to the skin. To accommodate the splice strap 3, these flanges are removed locally as indicated at 7; the splice strap thus may be continuous for the length of the skin joint. To compensate for the removal of these flanges, reinforcing angles 8 bridge the cut away area, being riveted to both the sides and flanges of the stiffeners by rivets 9 and 10. The rivets 10 also pass through the skin plates, and serve to transmit part of the skin loads into the angles.

The construction thus far described is conventional. However, it should be mentioned that if the joint were to comprise only the parts so far mentioned, the splice strap would have to be approximately twice as wide as shown and 50% thicker at its center, and approximately double the number of rivets 4 would be required, to carry the same compressive load.

To accomplish this improvement there are inserted at the juncture 12 between plates 1 and 2 a row of rivets 11, which also pass through the splice plate 3; some may pass through the angles 8 as well, as shown in Fig. 2.

These rivets 11 are partially received in each skin plates 1 and 2, and thus each is in contact with plate 1 through half (approximately) its circumference, and plate 2 through the other half. Being installed and driven in the usual manner, they expand during driving into tight engagement with both plates. Also, if the rivets are of the countersunk type shown in the drawings, the taper of the head adds assurance of tight engagement with the sheets 1 and 2.

Being tightly engaged with the adjacent edges of the two plates, the rivets 11 are ideally adapted to transmit compressive loads from one plate to the other, and do in fact carry very substantial loads. The dimensions of the splice strap 3, and the number of rivets attaching the splice strap to the skin plates, both may therefore be greatly reduced with substantial savings in cost, weight and complexity.

In an actual construction it was found that the present arrangement permitted a 48% reduction in the number of skin rivets 4, a 20% reduction of the number of stiffener angle rivets 9 and 10, a reduction of the maximum thickness of splice strap 3 from 0.188 inch to 0.125 inch, lightening of the angles 8 by 28%, all of which gave an overall weight reduction of 45%. In addition, the previously used splice strap, being thicker than the flanges 6 of the angles 5, was formed with a double taper, being thickest at its center, and the angles 8 had to be bent to accommodate the thick splice strap, which complications were eliminated by the present construction.

It will be apparent that although the principal function of the rivets 11 is to carry compressive loads which act in a direction normal to the skin juncture 12, these same rivets also act to key the sheets 1 and 2 together to resist shear loads parallel to the skin juncture, which type of load frequently occurs in conjunction with compressive stresses.

While we have shown conventional rivets at 11, and we prefer to use such for practical reasons, it is recognized that rivets having specially formed, enlarged heads may be advantageously employed in some cases. It is also clear that although we have shown countersunk rivets in the drawing, other types such as ordinary round or flat head rivets may be used if a flush surface is not required.

It is also feasible to use bolts, taper pins, or plain dowels in a similar manner. Rivets have the advantage, however, of accommodating themselves to holes of various sizes by virtue of the expanding action which takes place upon driving, whereas bolts or dowels must be fitted to holes made with precision in order to obtain tight fit.

It likewise is evident that, although we have shown our invention applied to relatively thin plates, it is equally adapted to joints in other structural elements, such as, for example, the stiffeners 5 shown in the drawing.

We claim as our invention:

A riveted metallic joint comprising two plates in closely adjacent edge-to-edge arrangement, a splice strap riveted to both of said plates, and a plurality of rivets passing through the splice strap and partially received in each of the two plates and in tight engagement therewith.

JOHN F. KORSBERG.
FRANK T. GUSTAFSON.
GEORGE SNYDER.

References Cited in the file of this patent

UNITED STATES PATENTS

| Number | Name | Date |
|---|---|---|
| 2,064,276 | Strattard | Dec. 15, 1936 |